United States Patent
Hellbusch

(10) Patent No.: US 9,527,539 B1
(45) Date of Patent: Dec. 27, 2016

(54) SWATHER HEADER TRANSPORT TRAILER

(71) Applicant: James A. Hellbusch, Columbus, NE (US)

(72) Inventor: James A. Hellbusch, Columbus, NE (US)

(73) Assignee: DUO LIFT MANUFACTURING CO., INC., Columbus, NE (US)

( * ) Notice: Subject to any disclaimer, the term of this patent is extended or adjusted under 35 U.S.C. 154(b) by 0 days.

(21) Appl. No.: 14/825,679

(22) Filed: Aug. 13, 2015

(51) Int. Cl.
*A01D 75/00* (2006.01)
*B62D 63/06* (2006.01)
*A01B 73/00* (2006.01)

(52) U.S. Cl.
CPC ........... *B62D 63/061* (2013.01); *A01B 73/005* (2013.01); *A01D 75/002* (2013.01)

(58) Field of Classification Search
CPC ..... A01B 73/005; A01D 75/002; B60P 3/066; B62D 63/061
USPC .................................................. 280/482, 638
See application file for complete search history.

(56) References Cited

U.S. PATENT DOCUMENTS

| | | | | |
|---|---|---|---|---|
| 4,371,299 A * | 2/1983 | Cain | ..................... | A01D 75/002 248/670 |
| 4,566,714 A * | 1/1986 | De Witt | ................. | B60P 1/6481 280/142 |
| 4,570,967 A * | 2/1986 | Allnutt | ................. | B62D 53/067 280/656 |
| 4,607,996 A * | 8/1986 | Koch | ................... | A01B 73/005 14/71.1 |
| 4,834,598 A * | 5/1989 | Bruns | ..................... | B60P 3/066 410/156 |
| 5,040,825 A * | 8/1991 | Kuhns | .................. | A01D 75/002 280/144 |
| 5,333,904 A * | 8/1994 | Kuhns | .................. | A01D 75/002 248/912 |
| 5,374,082 A * | 12/1994 | Smith | .................. | A01D 75/002 280/124.111 |
| 5,785,472 A * | 7/1998 | Smith | .................. | B62D 63/061 410/156 |
| 5,975,829 A * | 11/1999 | Walters | ................ | A01B 73/005 14/71.1 |
| 6,227,788 B1 * | 5/2001 | Brown | .................... | B60P 3/066 414/470 |
| 6,272,824 B1 * | 8/2001 | Smith | .................. | A01D 75/002 410/77 |
| 6,428,047 B1 * | 8/2002 | Kaderabek | ........... | A01B 73/005 280/781 |
| 7,125,198 B2 * | 10/2006 | Schiefferly | ........... | E01F 15/148 181/271 |
| 7,197,865 B1 * | 4/2007 | Enns | ..................... | A01B 73/005 56/228 |
| 7,490,856 B1 * | 2/2009 | Kuhns | .................. | A01D 75/002 248/225.11 |
| D628,600 S * | 12/2010 | Hicks | ............................. | D15/27 |

(Continued)

*Primary Examiner* — Joseph Rocca
*Assistant Examiner* — Daniel Yeagley
(74) *Attorney, Agent, or Firm* — Dennis L. Thomte; Thomte Patent Law Office LLC

(57) ABSTRACT

A swather header transport trailer which is configured to transport swather headers having different sizes and shapes. The trailer includes header support members which are horizontally adjustable mounted on the trailer. The trailer also includes at least two header supports which have structure thereon which may be attached to brackets on the underside or back side of the header.

2 Claims, 8 Drawing Sheets

(56) References Cited

U.S. PATENT DOCUMENTS

| | | | | |
|---|---|---|---|---|
| 8,662,525 | B1* | 3/2014 | Dierks | B62B 1/00 |
| | | | | 280/142 |
| 8,714,594 | B1* | 5/2014 | Hellbusch | A01D 75/002 |
| | | | | 280/140 |
| 8,740,249 | B1* | 6/2014 | Hellbusch | A01D 75/002 |
| | | | | 280/140 |
| 2002/0067969 | A1* | 6/2002 | Kuhns | A01D 75/002 |
| | | | | 410/2 |
| 2009/0166998 | A1* | 7/2009 | Groeneweg | E01F 15/148 |
| | | | | 280/408 |
| 2010/0219611 | A1* | 9/2010 | Groeneweg | E01F 15/148 |
| | | | | 280/482 |
| 2011/0176882 | A1* | 7/2011 | Bergen | A01D 75/002 |
| | | | | 410/44 |
| 2012/0217277 | A1* | 8/2012 | Hilvers | A01B 51/04 |
| | | | | 224/545 |
| 2014/0306424 | A1* | 10/2014 | Sivinski | A01D 75/002 |
| | | | | 280/405.1 |

* cited by examiner

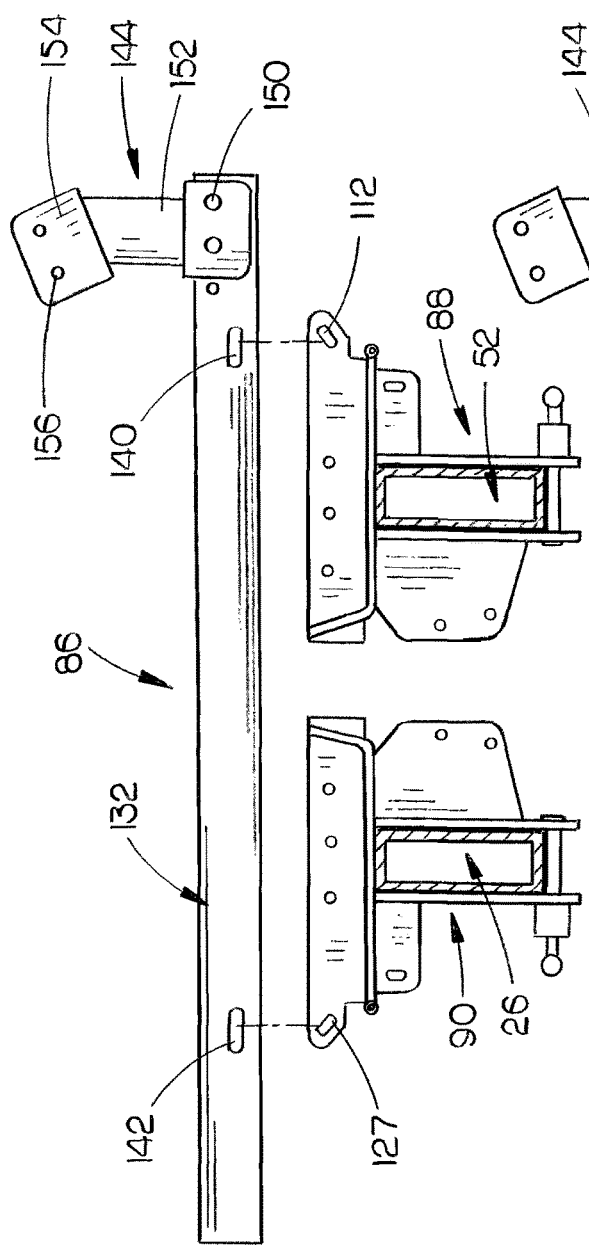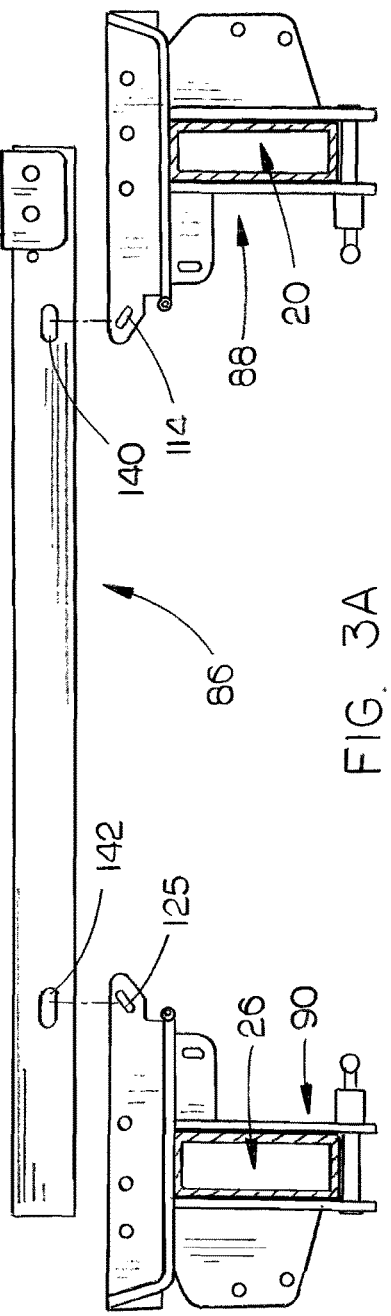
FIG. 3
FIG. 3A

SWATHER HEADER TRANSPORT TRAILER

BACKGROUND OF THE INVENTION

Field of the Invention

This invention relates to a swather header transport trailer and more particularly to a swather header transport trailer which has adjustable header supports thereon to enable the trailer to be used to transport different sizes and models of swather headers. Even more particularly, the invention includes adjustable safety tie-down devices to secure the header to the trailer.

Description of the Related Art

Many types of trailers have been previously provided for transporting the headers of combines in an end-wise manner from one location to another. One such trailer for transporting a combine header is disclosed in U.S. Pat. No. 6,428,047 which issued on Aug. 6, 2002. Although it is believed that the trailer of U.S. Pat. No. 6,428,047 works very well in the transport of combine headers, it is believed that the instant invention provides a trailer which may be used to transport a self-propelled swather header and which is configured to transport various sizes and lengths of swather headers in a safe and convenient manner.

In most combine header trailers, the trailers include longitudinally extending and spaced-apart first and second frame members. Due to the way the combine headers are secured to the feeder housing of the combine, the combine may be positioned relative to one side of the trailer to place the combine header on the trailer. However, in most, if not all, the self-propelled swathers have the header thereof pivotally or movably secured to the swather by a pair of elongated and curved arms which extend beneath the header.

A swather header cannot be mounted on a combine header trailer since one of the longitudinally extending frame members of the combine header trailer restricts the movement of the arms which connect the swather to the swather header. Further, it is believed that the header trailers of the prior art do not accommodate swather headers having various lengths and sizes.

SUMMARY OF THE INVENTION

This Summary is provided to introduce a selection of concepts in a simplified form that are further described below in the Detailed Description. This Summary is not intended to identify key aspects or essential aspects of the claimed subject matter. Moreover, this Summary is not intended for use as an aid in determining the scope of the claimed subject matter.

A swather header transport trailer is provided which has a forward end and a rearward end. The trailer includes a first elongated generally horizontally disposed first frame member having a forward end and a rearward end and a second elongated and generally horizontally disposed second frame member having a forward and a rearward end. The rearward end of the first frame member is positioned forwardly of the rearward end of the second frame member. A pivotal wheel assembly is operatively connected to the forward ends of the first and second frame members. The trailer also includes an elongated and horizontally disposed first support member which is secured to and extends between the first and second frame members and which is horizontally adjustable and vertically adjustable. The trailer also includes an elongated and horizontally disposed third frame member, having first and second ends, with the first end of the third frame member being secured to the rearward end of the first frame member and with the second end of the third frame member being secured to the second frame member. An elongated and horizontally disposed fourth frame member, having forward and rearward ends, has its forward end secured to the third frame member intermediate the first and second ends of the third frame member. An elongated and horizontally disposed fifth frame member, having first and second ends, has its second end secured to the second frame member with the fifth frame member being secured to the rearward end of the fourth frame member between the first and second ends of the fifth frame member. An elongated and horizontally disposed sixth frame member, having forward and rearward ends, has its forward end secured to the first end of the fifth frame member so as to extend rearwardly therefrom. A first wheel is operatively secured to the rearward end of the sixth frame member and a second wheel is operatively secured to the rearward end of the second frame member.

An elongated and horizontally disposed second support member, having first and second ends, extends between the sixth and second frame members and is selectively horizontally adjustable and selectively vertically adjustable with respect to the sixth and second frame members. A first header support assembly is selectively horizontally adjustably secured to the fourth frame member and the second frame member and a second header support assembly is selectively horizontally adjustably secured to the fourth frame member and the second frame member rearwardly of the first header support assembly. Each of the first and second header support assemblies include a connector element thereon for connection to a header positioned on the trailer.

The first header support assembly may be configured to the first and second frame members so as to extend therebetween. The second header support assembly may be secured to the sixth and second frame members forwardly of the drive wheels thereof.

It is a principal object of the invention to provide an improved header transport trailer.

It is a further object of the invention to provide a header transport trailer which is configured to support various sizes and models of swather headers.

A further object of the invention is to provide a header transport trailer which is adapted to have a header conveniently and securely secured thereto.

These and other objects will be apparent to those skilled in the art.

BRIEF DESCRIPTION OF THE DRAWINGS

Non-limiting and non-exhaustive embodiments of the present invention are described with reference to the following figures, wherein like reference numerals refer to like parts throughout the various views unless otherwise specified.

FIG. 3 is an end view of the header support of FIG. 2;

FIG. 3A is another end view of the header support of FIG. 2;

DESCRIPTION OF THE PREFERRED EMBODIMENT

Figure 1:
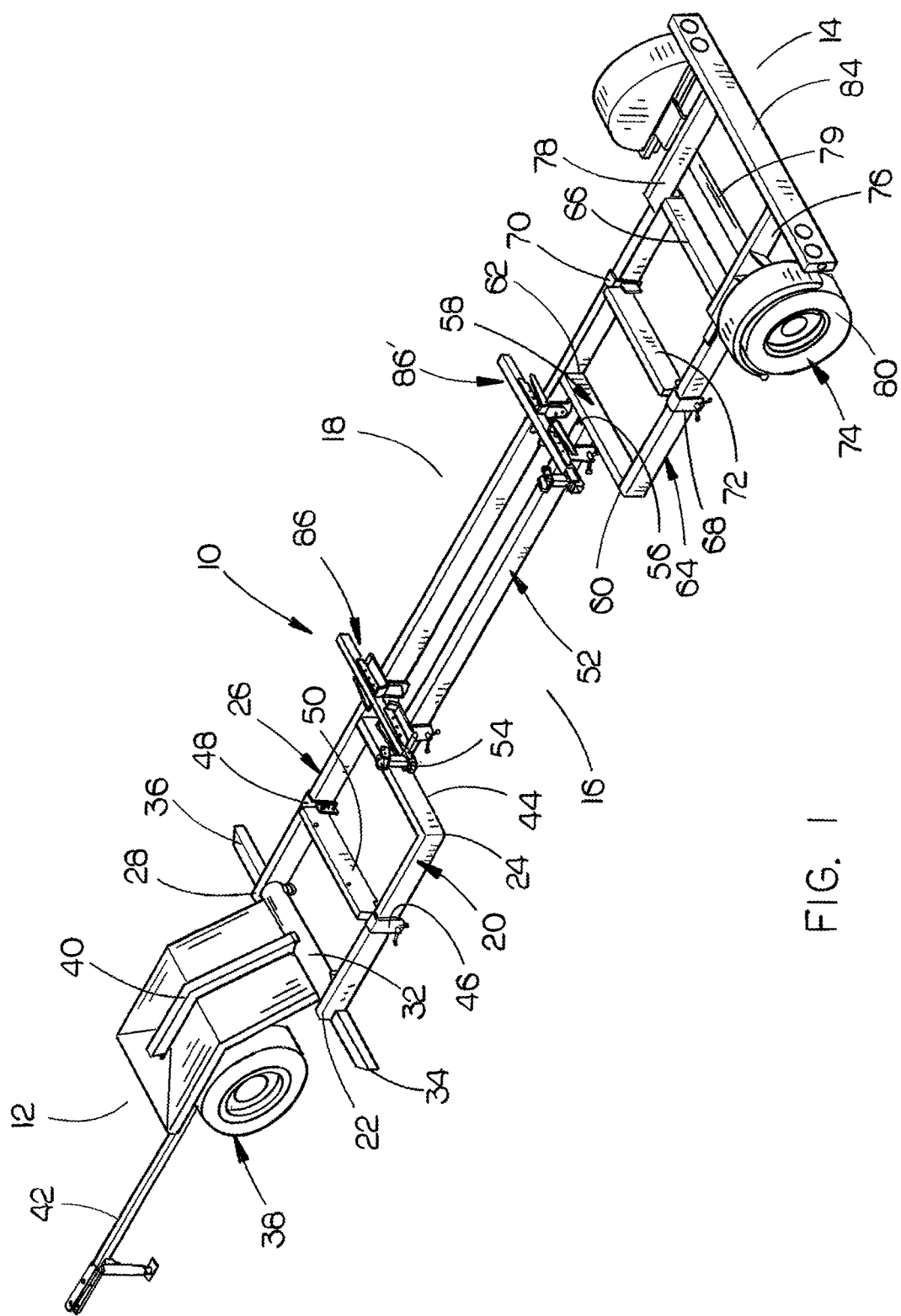
FIG. 1 is a perspective view of the trailer of this invention.

Embodiments are described more fully below with reference to the accompanying figures, which form a part hereof and show, by way of illustration, specific exemplary embodiments. These embodiments are disclosed in sufficient detail to enable those skilled in the art to practice the invention. However, embodiments may be implemented in many different forms and should not be construed as being limited to the embodiments set forth herein. The following detailed description is, therefore, not to be taken in a limiting sense in that the scope of the present invention is defined only by the appended claims.

The header trailer of this invention is referred to by the reference numeral 10 and which has a forward end 12, a rearward end 14, a left side 16 and a right side 18. Trailer 10 includes a longitudinally extending frame member 20 having a forward end 22 and a rearward end 24. Trailer 10 also includes a longitudinally extending frame member 26 having a forward end 28 and a rearward end 30. A horizontally disposed beam 32 is secured to the forward ends 22 and 28 of frame members 20 and 26 respectively and extends therebetween. A horizontally disposed support 34 is secured to frame member 20 at the forward end thereof and extends outwardly therefrom. A horizontally disposed support 36 is secured to frame member 26 at the forward end thereof and extends outwardly therefrom.

The numeral 38 refers to a pivotal wheel assembly which is connected to beam 32 by a supporting frame structure 40. Hitch tongue 42 is connected to the wheel assembly 38 in conventional fashion and extends forwardly therefrom for connection to a prime mover such as a truck, tractor, etc.

A cross-frame member 44 has one end thereof secured to the rearward end 24 of frame member 20 and has its other end secured to frame member 26 as seen in FIG. 1. An inverted U-shaped clamping bracket 46 is selectively horizontally slidably mounted on frame member 20 and an inverted U-shaped clamping bracket 48 is selectively horizontally slidably mounted on frame member 26. A horizontally disposed frame member 50 has its ends selectively vertically adjustably secured to brackets 46 and 48 so as to extend between frame members 20 and 26.

The numeral 52 refers to a longitudinally extending frame member having a forward end 54 and a rearward end 56. The forward end 54 of frame member 52 is secured to cross-frame member 44 as seen in FIG. 1. Frame member 52 is spaced from frame member 26 as seen in the drawings. The rearward end 56 of frame member 52 is secured to a cross-frame member 58 having ends 60 and 62. End 62 of cross-frame member 58 is secured to frame member 26. Frame member 64 has its forward end secured to end 60 of frame member 58 and extends rearwardly therefrom. A cross-frame member 66 has one end thereof secured to the rearward end of frame member 64 and has its other end secured to the rearward end of frame member 26.

A pair of inverted U-shaped brackets 68 and 70 are selectively horizontally slidably mounted on frame members 64 and 26 respectively. A cross-frame member 72 is selectively vertically mounted on brackets 68 and 70 and extends therebetween. A wheel assembly 74 is mounted at the rearward end of the trailer 10. Wheel assembly 74 includes longitudinally extending frame members 76 and 78 which extend rearwardly from the rearward ends of frame members 64 and 26 respectively. An axle support 79 is secured to frame members 76 and 78 and has wheels 80 and 82 rotatably mounted on the ends thereof. A bumper 84 is secured to the rearward ends of frame members 76 and 78. The trailer 10 is designed to haul or transport a swather header which may have different sizes.

Header supports 86 and 86' are selectively horizontally slidably mounted on frame members 26 and 52 as seen in FIG. 1. The header supports 86 and 86' may also be mounted on frame members 20 and 26 or on frame members 64 and 26. Inasmuch as header supports 86 and 86' are identical, only header support 86 will be described in detail with "'" indicating identical structure on header support 86'.

Figure 2:
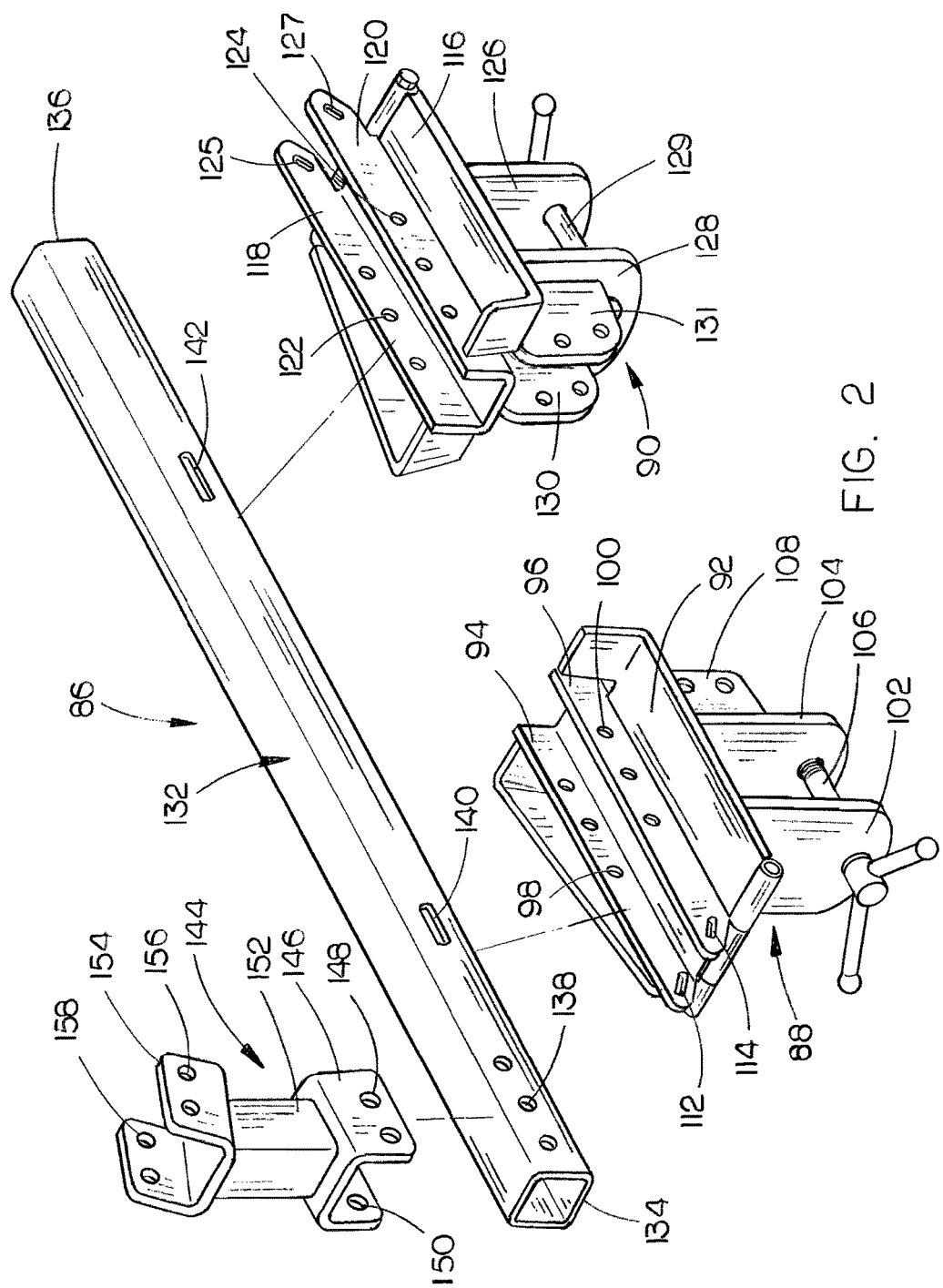
FIG. 2 is an exploded perspective view of one of the header supports of the trailer.

Header support 86 includes a left chock or bracket 88 and a right chock or bracket 90. Bracket 88 includes an upper plate 92 having a pair of spaced-apart rails 94 and 96 extending upwardly therefrom which have a plurality of pin openings 98 and 100 formed therein respectively. Bracket 88 also includes a pair of mounting plates 102 and 104 which extend downwardly from plate 92. A retaining clamp bolt 106 extends through plates 102 and 104 as seen in FIG. 2. A pair of gusset plates 108 and 110 extend downwardly from the underside of plate 92 adjacent plate 104. Slots 112 and 114 are formed in one end of rails 94 and 96 as seen in FIG. 2.

Bracket 90 includes an upper plate 116 having a pair of spaced-apart rails 118 and 120 extending upwardly therefrom which have a plurality of pin openings 122 and 124 formed therein respectively. Bracket 90 also includes a pair of mounting plates 126 and 128 which extend downwardly from plate 116. A retaining clamp bolt 129 extends through plates 126 and 128 as seen in FIG. 2. A pair of gusset plates 130 and 131 extend downwardly from the underside of plate 116 adjacent plate 128. Slots 125 and 127 are formed in one end of rails 118 and 120 as seen in FIG. 2.

Header support 86 also includes an elongated support member 132 having ends 134 and 136. A plurality of pin openings 138 are formed in the side walls of support member 132 at end 134. A pair of spaced-apart slots 140 and 142 are formed in the side walls of support member 132. Header support 86 also includes an upstanding support post 144 which includes an inverted U-shaped or channel-shaped lower end portion 146 having registering openings 148 and 150 formed therein. Post member 152 extends upwardly from lower end portion 146 and includes U-shaped or channel-shaped upper end portion 154 which has registering openings 156 and 158 formed therein.

Figure 4:
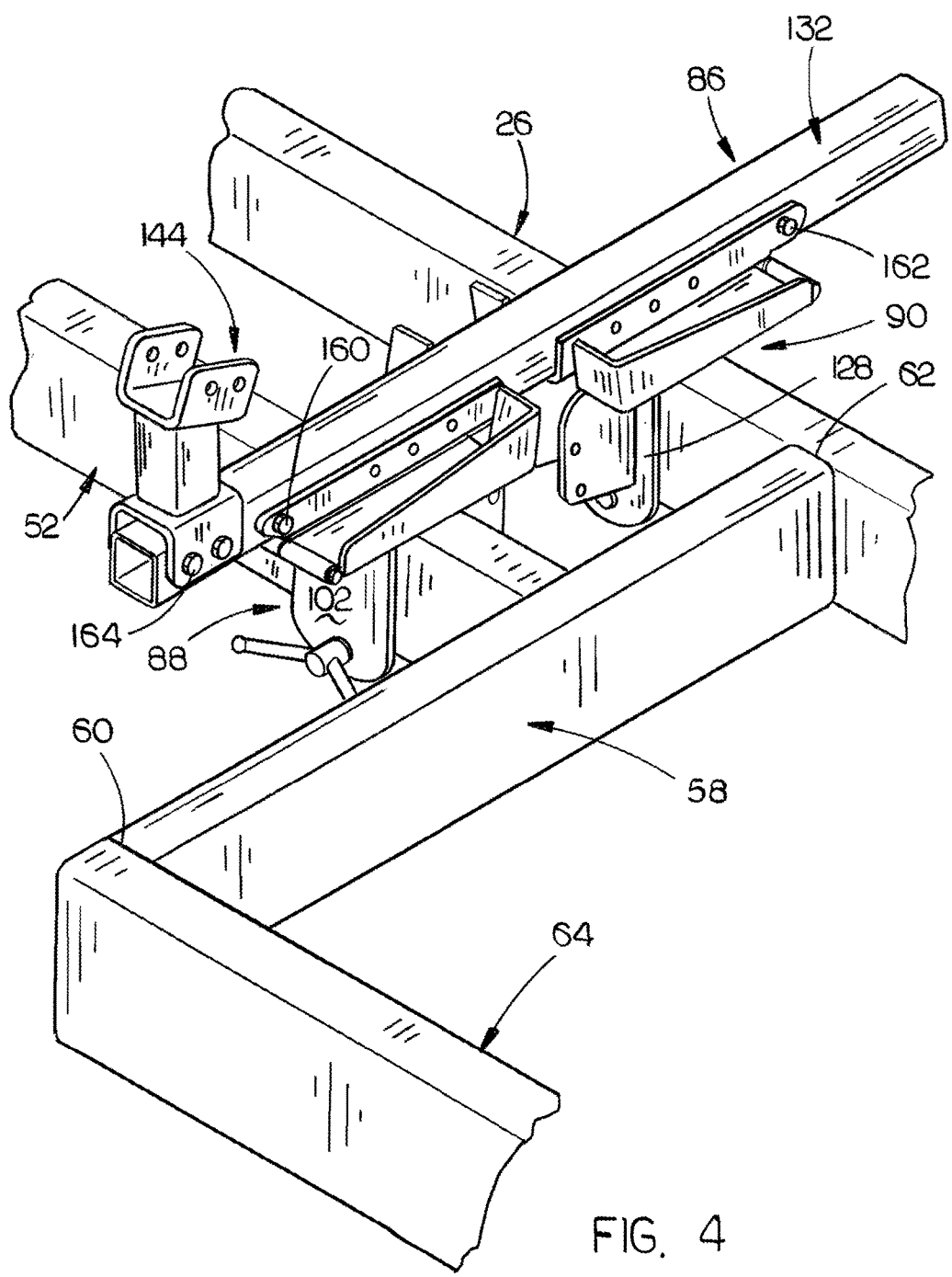
FIG. 4 is a partial perspective view illustrating the header support of FIG. 2 mounted on the trailer.
Figure 5:
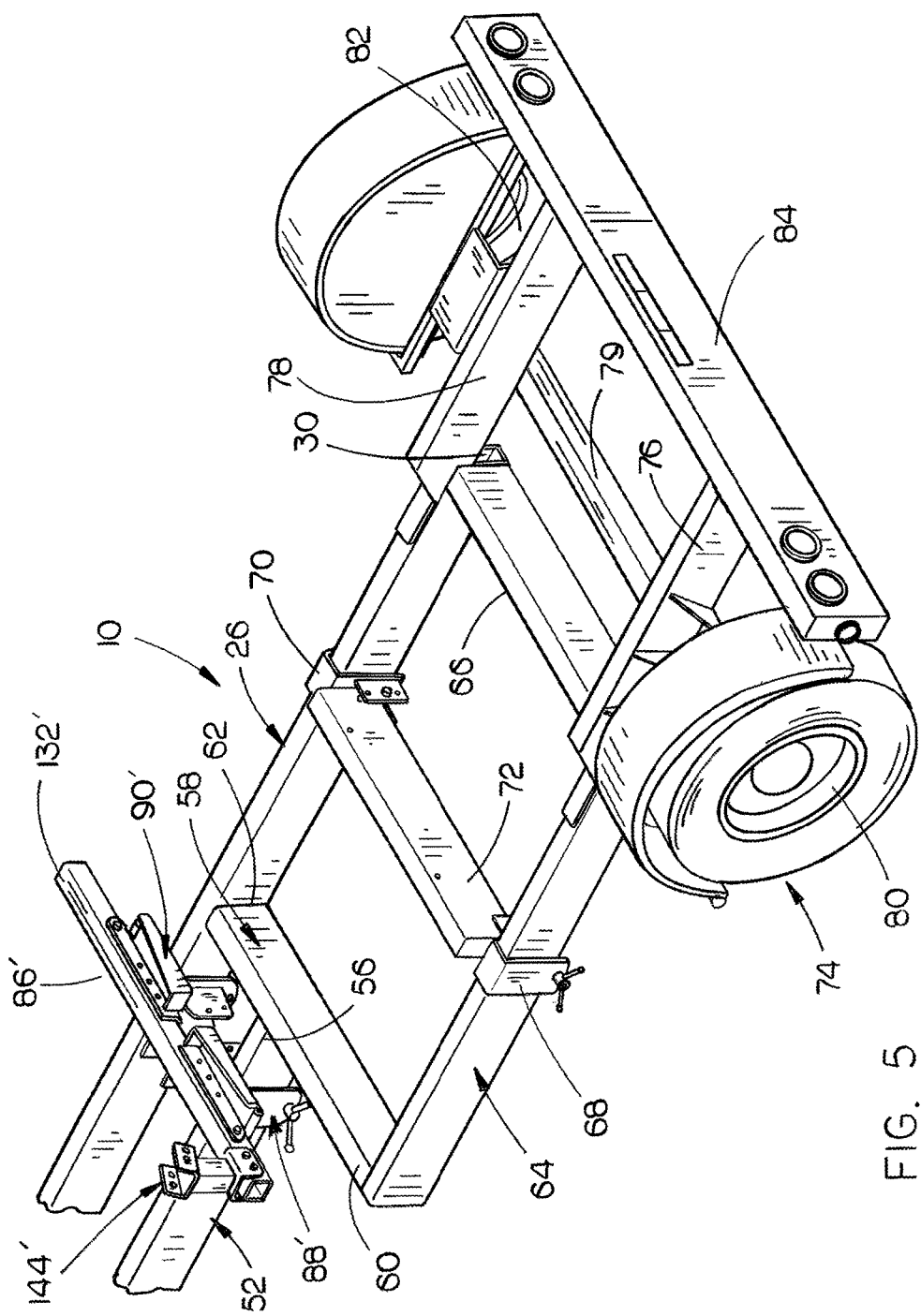
FIG. 5 is a partial perspective view of the rearward portion of the trailer.
Figure 6:
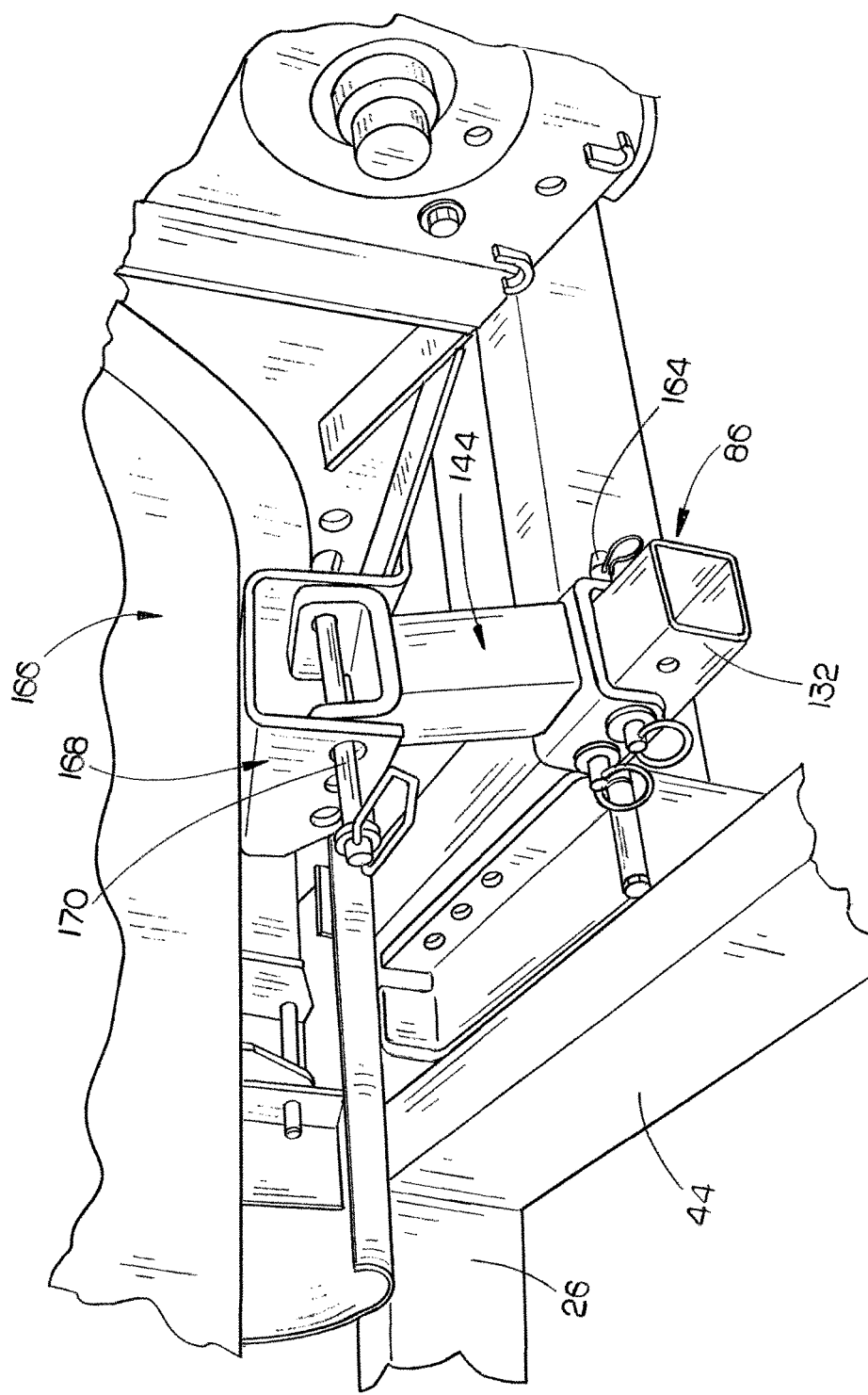
FIG. 6 is a partial perspective view illustrating the header being secured to the header support of FIG. 2.
Figure 7:
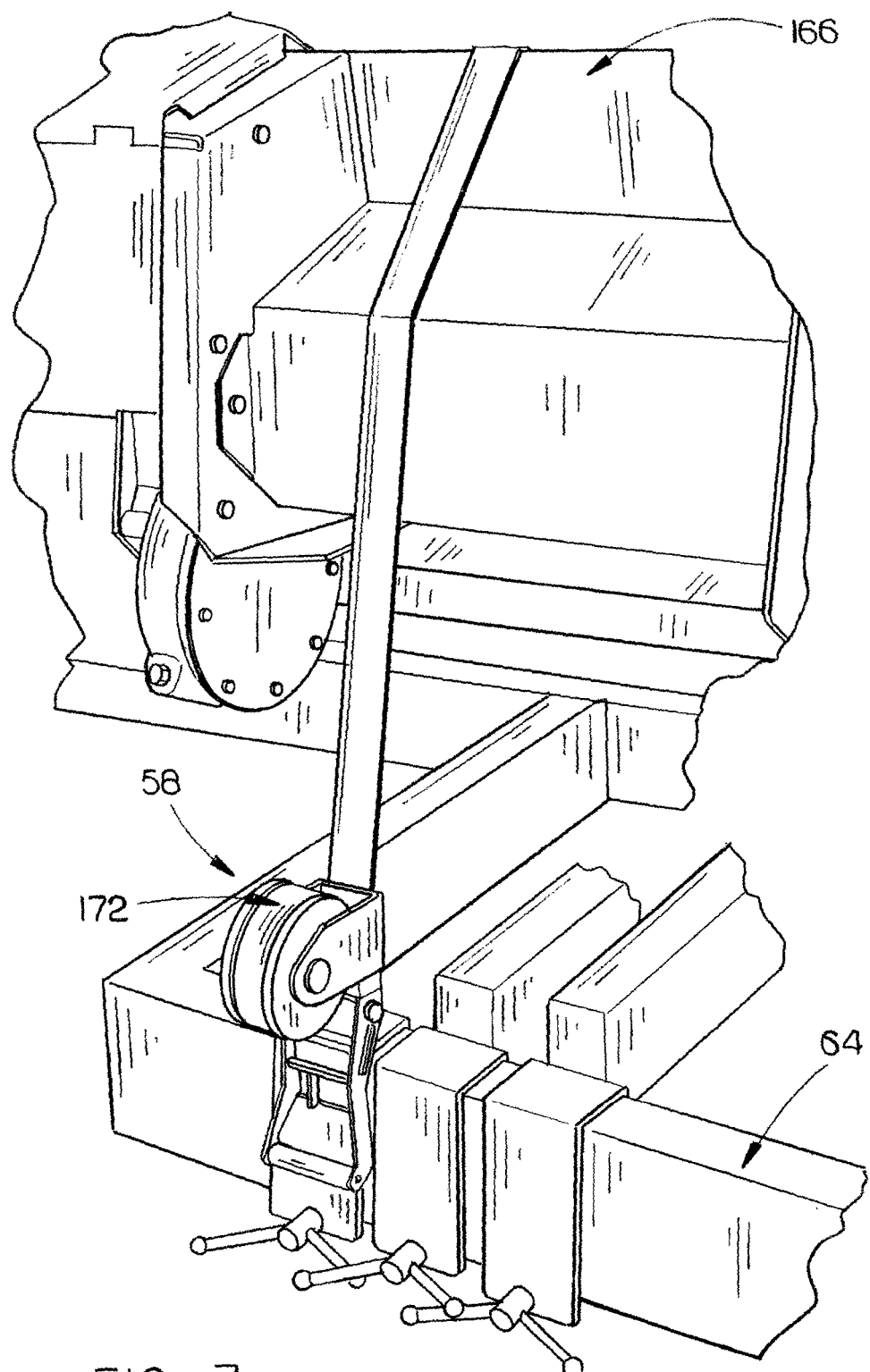
FIG. 7 is a partial perspective view illustrating the header support on the trailer with a tie-down strap securing the header to the trailer.
Figure 8:
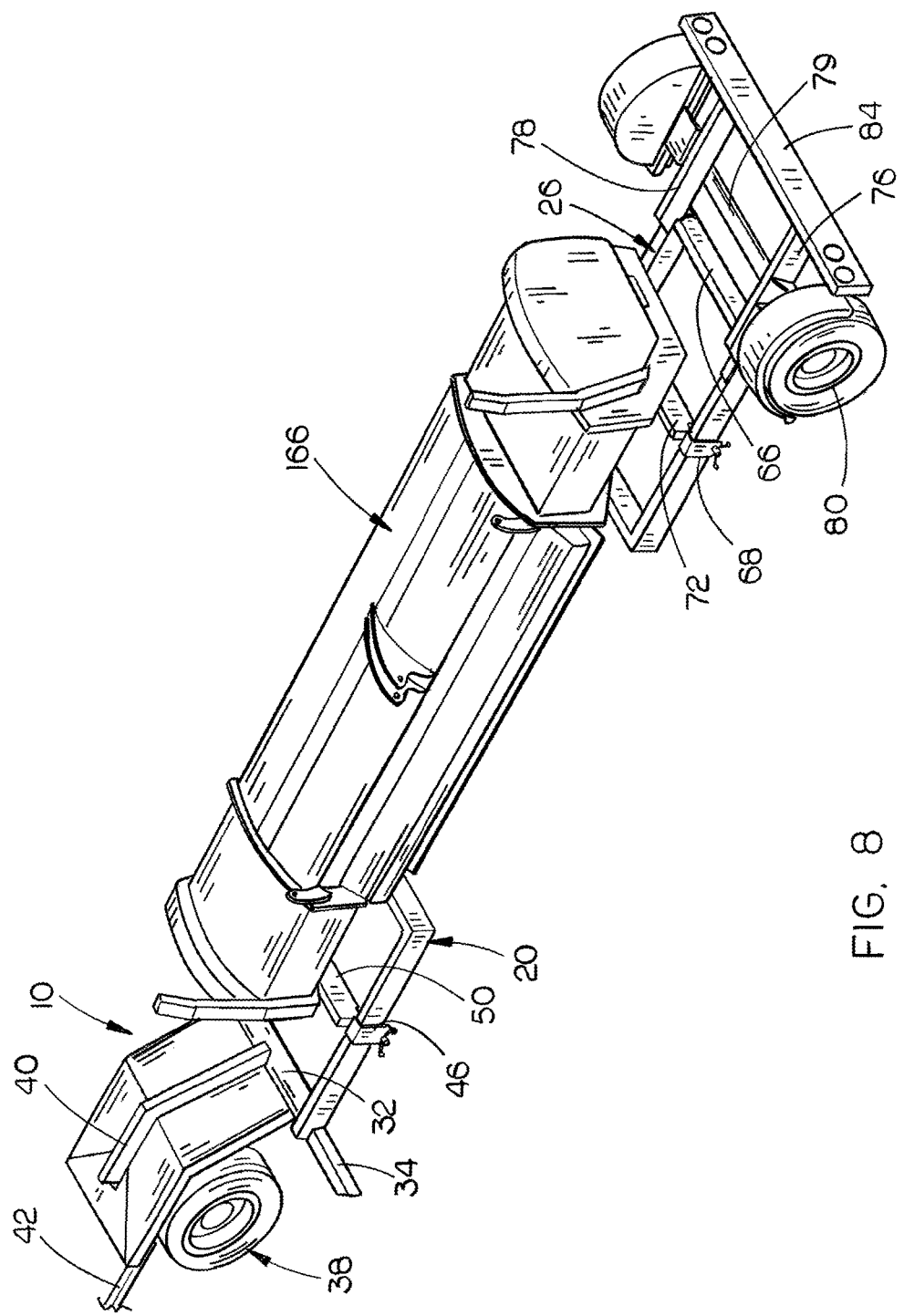
FIG. 8 is a perspective view of a header mounted on the trailer.

As seen in FIG. 4, when the header support 86 is mounted on frame members 26 and 52, the left bracket 88 is selectively longitudinally slidably mounted on frame member 52 and the right bracket 90 is selectively longitudinally mounted on frame member 26. The slots on the rails of brackets 88 and 90 will be on the outer sides of the brackets 88 and 90 (FIG. 3). Support member 132 is placed between the rails 94 and 96 of bracket 88 and the rails 118 and 120 of bracket 90. Pin 160 is then extended through slot 114 in rail 96, through the slot 140 in support member 132 and through slot 112 in rail 94 and pinned. Pin 162 is extended through slot 127 of rail 120, slots 142 of support member and through slot 125 of rail 118 and pinned. The support post 144 is then positioned on end 134 of support member 132. The lower end of support post 144 is then selectively horizontally adjustably secured to support member 132 by the pins 164.

If the header support 86 is going to be mounted on frame members 20 and 26, the bracket 88 is reversed so that slots 112 and 114 face inwardly as seen in FIG. 3A and the bracket 90 is reversed so that slots 125 and 127 face inwardly as also seen in FIG. 3A thus creating a greater distance between brackets 88 and 90.

The header 166 is then placed on the trailer 10 so as to be supported on the vertically adjustable frame members 50 and 72 and on the header supports 86 and 86' so that the upper ends of the support posts 144 and 144' are received within the brackets 168 on the underside of the header 166. The pins 170 secure the support posts 144 and 144'.

A plurality of strap assemblies 172 are utilized to further secure the header 166 to the trailer.

It can be seen that an improved trailer has been provided for transporting various sizes and models of headers.

Thus it can be seen that the invention accomplishes at least all of its stated objectives.

Although the invention has been described in language that is specific to certain structures and methodological steps, it is to be understood that the invention defined in the appended claims is not necessarily limited to the specific structures and/or steps described. Rather, the specific aspects and steps are described as forms of implementing the claimed invention. Since many embodiments of the invention can be practiced without departing from the spirit and scope of the invention, the invention resides in the claims hereinafter appended.

I claim:

1. A swather header transport trailer having a forward end and a rearward end, comprising:
   a first elongated and generally horizontally disposed first frame member having a forward end and a rearward end;
   a second elongated and generally horizontally disposed second frame member having a forward end and a rearward end;
   said first and second frame members being spaced from one another;
   said rearward end of said first frame member being positioned forwardly of said rearward end of said second frame member;
   a horizontally disposed beam having first and second ends;
   said first end of said beam being secured to said forward end of said first frame member;
   said second end of said beam being secured to said forward end of said second frame member;
   a pivotal wheel assembly operatively secured to said beam so as to be positioned forwardly of said beam;
   a hitch tongue secured to said pivotal wheel assembly and which extends forwardly from said pivotal wheel assembly for connection to a prime mover;
   an elongated and horizontally disposed first support member, having first and second ends, which extends between said first and second frame members;
   said first end of said first support member being selectively horizontally slidably secured to said first frame member;
   said first end of said first support member being selectively vertically adjustably secured to said first frame member;
   said second end of said first support member being selectively horizontally slidably secured to said second frame member;
   said second end of said first support member being selectively vertically adjustably secured to said second frame member;
   an elongated and horizontally disposed third frame member having first and second ends;
   said first end of said third frame member being secured to said rearward end of said first frame member;
   said second end of said third frame member being secured to said second frame member;
   an elongated and horizontally disposed fourth frame member having forward and rearward ends;
   said forward end of said fourth frame member being secured to said third frame member intermediate said first and second ends of said third frame member;
   said fourth frame member being parallel to and spaced from said second frame member;
   an elongated and horizontally disposed fifth frame member having first and second ends;
   said second end of said fifth frame member being secured to said second frame member;
   said fifth frame member being secured to said rearward end of fourth frame member between said first and second ends of said fifth frame member;
   an elongated and horizontally disposed sixth frame member having forward and rearward ends;
   said forward end of said sixth frame member being secured to said first end of said fifth frame member so as to extend rearwardly from said fifth frame member;
   a first wheel operatively secured to said rearward end of said sixth frame member;
   a second wheel operatively secured to said rearward end of said second frame member;
   a bumper operatively secured to said rearward end of said sixth frame member and said rearward end of said second frame member;
   an elongated and horizontally disposed second support member, having first and second ends, which extends between said sixth and second frame members;
   said first end of said second support member being selectively horizontally slidably secured to said sixth frame member;
   said first end of said second support member being selectively vertically adjustably secured to said sixth frame member;
   said second end of said second support member being selectively horizontally slidably secured to said second frame member;
   said second end of said second support member being selectively vertically adjustably secured to said second frame member;
   a first header support assembly selectively horizontally adjustably secured to said fourth frame member and said second frame member;
   a second header support assembly selectively horizontally adjustably secured to said fourth frame member and second frame member rearwardly of said first header support assembly;
   said first header support assembly including a connector element thereon for connection to a header positioned on the trailer; and
   said second header support assembly including a connector element thereon for attachment to a header positioned on the trailer.

2. A swather header transport trailer having a forward end and a rearward end, comprising:

a first elongated and generally horizontally disposed first frame member having a forward end and a rearward end;

a second elongated and generally horizontally disposed second frame member having a forward end and a rearward end;

said rearward end of said first frame member being positioned forwardly of said rearward end of said second frame member;

a horizontally disposed beam having first and second ends;

said first end of said beam being secured to said forward end of said first frame member;

said second end of said beam being secured to said forward end of said second frame member;

a pivotal wheel assembly being operatively secured to said beam so as to be positioned forwardly of said beam;

a hitch secured to said pivotal wheel assembly and which extends forwardly from said pivotal wheel assembly for connection to a prime mover;

an elongated and horizontally disposed third frame member having first and second ends;

said first end of said third frame member being secured to said rearward end of said first frame member;

said second end of said third frame member being secured to said second frame member;

an elongated and horizontally disposed fourth frame member having forward and rearward ends;

said forward end of said fourth frame member being secured to said third frame member intermediate said first and second ends of said third frame member;

said fourth frame member being parallel to said second frame member;

an elongated and horizontally disposed fifth frame member having first and second ends;

said second end of said fifth frame member being secured to said second frame member;

said fifth frame member being secured to said rearward end of fourth frame member between said first and second ends of said fifth frame member;

an elongated and horizontally disposed sixth frame member having forward and rearward ends;

said forward end of said sixth frame member being secured to said first end of said fifth frame member so as to extend rearwardly from said fifth frame member;

a first wheel operatively secured to said rearward end of said sixth frame member;

a second wheel operatively secured to said rearward end of said second frame member;

a bumper operatively secured to said rearward end of said sixth frame member and said rearward end of said second frame member;

a first header support assembly selectively horizontally adjustably secured to said first and second frame members and which extends between said first and second frame members;

a second header support assembly selectively horizontally adjustably secured to said sixth and second frame members;

said first header support assembly including a connector element for connection to a header positioned on the trailer;

said second header support assembly including a connector element for connection to a header positioned on the trailer.

\* \* \* \* \*